US012119010B2

(12) United States Patent
Breebaart

(10) Patent No.: US 12,119,010 B2
(45) **Date of Patent: *Oct. 15, 2024**

(54) ACOUSTIC ENVIRONMENT SIMULATION

(71) Applicant: Dolby Laboratories Licensing Corporation, San Francisco, CA (US)

(72) Inventor: Dirk Jeroen Breebaart, Ultimo (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,385

(22) Filed: Aug. 7, 2023

(65) Prior Publication Data

US 2024/0038248 A1 Feb. 1, 2024

Related U.S. Application Data

(63) Continuation of application No. 17/510,205, filed on Oct. 25, 2021, now Pat. No. 11,721,348, which is a (Continued)

(30) Foreign Application Priority Data

Jan. 27, 2016 (EP) .................................... 16152990

(51) Int. Cl.
*G10L 19/012* (2013.01)
*G10L 19/00* (2013.01)
(Continued)

(52) U.S. Cl.
CPC ............ *G10L 19/008* (2013.01); *G10L 19/00* (2013.01); *G10L 19/012* (2013.01); *G10L 19/0212* (2013.01)

(58) Field of Classification Search
CPC ..... G10L 19/008; G10L 19/00; G10L 19/012; G10L 19/0212
(Continued)

(56) References Cited

U.S. PATENT DOCUMENTS 4,493,101 A 1/1985 Muraoka
6,016,473 A 1/2000 Dolby
(Continued)

FOREIGN PATENT DOCUMENTS

EP 2194526 6/2010
KR 20100063639 A2 * 6/2010 .......... G10L 19/022
(Continued)

OTHER PUBLICATIONS

J. Herre and S. Disch, "New Concepts in Parametric Coding of Spatial Audio: From SAC to SAOC," 2007 IEEE International Conference on Multimedia and Expo, Beijing, China, 2007, pp. 1894-1897, doi: 10.1109/ICME.2007.4285045. keywords: {Audio coding; Digital audio players; Decoding; Bit rate; Layout; Signal (Year: 2007).*
(Continued)

*Primary Examiner* — Bharatkumar S Shah

(57) ABSTRACT

Encoding/decoding an audio signal having one or more audio components, wherein each audio component is associated with a spatial location. A first audio signal presentation (z) of the audio components, a first set of transform parameters (w(f)), and signal level data ($\beta^2$) are encoded and transmitted to the decoder. The decoder uses the first set of transform parameters (w(f)) to form a reconstructed simulation input signal intended for an acoustic environment simulation, and applies a signal level modification ($\alpha$) to the reconstructed simulation input signal. The signal level modification is based on the signal level data ($\beta^2$) and data ($p^2$) related to the acoustic environment simulation. The attenuated reconstructed simulation input signal is then processed in an acoustic environment simulator. With this process, the decoder does not need to determine the signal level of the simulation input signal, thereby reducing processing load.

13 Claims, 5 Drawing Sheets

Related U.S. Application Data continuation of application No. 16/841,415, filed on Apr. 6, 2020, now Pat. No. 11,158,328, which is a continuation of application No. 16/073,132, filed as application No. PCT/US2017/014507 on Jan. 23, 2017, now Pat. No. 10,614,819.

(60) Provisional application No. 62/287,531, filed on Jan. 27, 2016.

(51) Int. Cl.
*G10L 19/008* (2013.01)
*G10L 19/02* (2013.01)

(58) Field of Classification Search
USPC .......................................................... 704/500
See application file for complete search history.

(56) References Cited

U.S. PATENT DOCUMENTS

| | | | | |
|---|---|---|---|---|
| 8,363,865 | B1 | 1/2013 | Bottum | |
| 8,520,873 | B2 | 8/2013 | Mahabub | |
| 8,824,688 | B2 | 9/2014 | Schreiner | |
| 9,009,057 | B2 | 4/2015 | Breebaart | |
| 9,042,565 | B2 | 5/2015 | Jot | |
| 9,078,076 | B2 | 7/2015 | Furse | |
| 10,905,943 | B2 * | 2/2021 | Perry | G02B 27/017 |
| 2011/0022402 | A1 * | 1/2011 | Engdegard | H04S 7/30 381/119 |
| 2011/0035227 | A1 | 2/2011 | Lee | |
| 2011/0188662 | A1 | 8/2011 | Jensen | |
| 2012/0082319 | A1 | 4/2012 | Jot | |
| 2014/0153727 | A1 | 6/2014 | Walsh | |
| 2015/0154965 | A1 | 6/2015 | Wuebbolt | |
| 2015/0230040 | A1 * | 8/2015 | Squires | H04S 7/302 381/303 |
| 2017/0064484 | A1 | 3/2017 | Borss | |

FOREIGN PATENT DOCUMENTS

| | | |
|---|---|---|
| WO | 2009/125046 | 10/2009 |
| WO | 2012/093352 | 7/2012 |
| WO | 2015/102920 | 7/2015 |
| WO | 2017/035163 | 3/2017 |
| WO | 2017/035281 | 3/2017 |

OTHER PUBLICATIONS

Gaoyong Luo, "2D spatial-frequency processing based audio coding for real time wireless transmission," Proceedings of the Fifth IEEE International Symposium on Signal Processing and Information Technology, 2005., Athens, Greece, 2005, pp. 63-68, doi: 10.1109/ISSPIT.2005.1577071. keywords: {Audio codi (Year: 2005).*

Cossette, Stan, "Metadata issues for ATSC audio"., pub Jul. 31, 1999., located via inspec., ISSN: 0036-1682; Publisher: Soc. Motion Picture & Telev. Eng., USA., Source: SMPTE Journal, v 108, n 7, 486-90, Jul. 1999.

E. Jovanov, K. Wegner, V. Radivojevic, D. Starcevic, M. S. Quinn and D. B. Karron, "Tactical audio and acoustic rendering in biomedical applications," in IEEE Transactions on Information Technology in Biomedicine, vol. 3, No. 2, pp. 109-118, Jun. 1999, doi : 10.1109/4233. 767086. (Year: 1999) (Year: 1999).

EBU R128 "Loudness Normalisation and Permitted Maximum Level of Audio Signals" Geneva, Jun. 2014.

Faller, C. et al "Binaural cue coding: a novel and efficient representation of spatial audio"., Pub May 17, 2002. IEEE International Conference on Acoustics, Speech, and Signal Processing. Proceedings (Cat. No.02CH37334), II-1841-4 vol.2, 2002; ISBN-10: 0-7803-7402-9; DOI: 10.1109/ICASSP.2002.1006124; Conference: Proceedings of International Conference on Acoustics, Speech and Signal Processing (CASSP'02), May 13-17, 2002, Orlando, FL, USA; Sponsor: IEEE Signal Process. Soc; Publisher: IEEE, Piscataway, NJ, USA.

Faller, C. et al "Binaural cue coding—Part II: Schemes and applications"., pub Nov. 30, 2003., located via inspec., Source: IEEE Transactions on Speech and Audio Processing, v 11, n 6, 520-31, Nov. 2003.

ITU-R BS.1770-4 "Algorithms to Measure Audio Programme Loudness and True-Peak Audio Level" Oct. 2015.

Kutruff, Heinrich, "Room Acoustics" CRC Press, 2009.

Mehrotra, S. et al "Low Bitrate audio coding using generalized adaptive gain shape vector quantization across channels", IEEE International Conference on Acoustics, Speech and Signal Processing—Proceedings, p. 9-12, 2009, Apr. 19, 2009-Apr. 24, 2009.

Seefeldt, A. et al "New techniques in spatial audio coding" AES Convention presented at the 119th Convention, Oct. 7-10, 2005, New York, USA.

Wightman, F. et al "Sound Localization" Springer for Research & Development, Human Psychophysics, pp. 155-192, 1993.

* cited by examiner

ACOUSTIC ENVIRONMENT SIMULATION

CROSS-REFERENCE TO RELATED APPLICATIONS

The present application is a continuation of U.S. patent application Ser. No. 17/510,205, filed Oct. 25, 2021, which is a continuation of U.S. patent application Ser. No. 16/841,415, filed Apr. 6, 2020, now U.S. Pat. No. 11,158,328 which is a continuation of U.S. patent application Ser. No. 16/073,132, filed Jul. 26, 2018, now U.S. Pat. No. 10,614,819, issued Apr. 7, 2020, which is the U.S. national stage of International Patent Application No. PCT/US2017/014507 filed Jan. 23, 2017, which claims priority to U.S. Provisional Patent Application No. 62/287,531, filed Jan. 27, 2016, and European Patent Application No. 16152990.4, filed Jan. 27, 2016, all of which are incorporated herein by reference in their entirety.

FIELD OF THE INVENTION

The present invention relates to the field of audio signal processing, and discloses methods and systems for efficient simulation of the acoustic environment, in particular for audio signals having spatialization components, sometimes referred to as immersive audio content.

BACKGROUND OF THE INVENTION

Any discussion of the background art throughout the specification should in no way be considered as an admission that such art is widely known or forms part of common general knowledge in the field.

Content creation, coding, distribution and reproduction of audio are traditionally performed in a channel based format, that is, one specific target playback system is envisioned for content throughout the content ecosystem. Examples of such target playback systems audio formats are mono, stereo, 5.1, 7.1, and the like.

If content is to be reproduced on a different playback system than the intended one, a downmixing or upmixing process can be applied. For example, 5.1 content can be reproduced over a stereo playback system by employing specific downmix equations. Another example is playback of stereo encoded content over a 7.1 speaker setup, which may comprise a so-called upmixing process, which could or could not be guided by information present in the stereo signal. A system capable of upmixing is Dolby Pro Logic from Dolby Laboratories Inc (Roger Dressler, "Dolby Pro Logic Surround Decoder, Principles of Operation", www.Dolby.com).

An alternative audio format system is an audio object format such as that provided by the Dolby Atmos system. In this type of format, objects are defined to have a particular location around a listener, which may be time varying. Audio content in this format is sometimes referred to as immersive audio content.

When stereo or multi-channel content is to be reproduced over headphones, it is often desirable to simulate a multi-channel speaker setup by means of head-related impulse responses (HRIRs), or binaural room impulse responses (BRIRs), which simulate the acoustical pathway from each loudspeaker to the ear drums, in an anechoic or echoic (simulated) environment, respectively. In particular, audio signals can be convolved with HRIRs or BRIRs to re-instate inter-aural level differences (ILDs), inter-aural time differences (ITDs) and spectral cues that allow the listener to determine the location of each individual channel. The simulation of an acoustic environment (reverberation) also helps to achieve a certain perceived distance. FIG. 1 illustrates a schematic overview of the processing flow for rendering two object or channel signals $x_i$ 10, 11, being read out of a content store 12 for processing by 4 HRIRs e.g. 14. The HRIR outputs are then summed 15, 16, for each channel signal, so as to produce headphone speaker outputs for playback to a listener via headphones 18. The basic principle of HRIRs is, for example, explained in Wightman, Frederic L., and Doris J. Kistler. "Sound localization." Human psychophysics. Springer New York, 1993. 155-192.

The HRIR/BRIR convolution approach comes with several drawbacks, one of them being the substantial amount of convolution processing that is required for headphone playback. The HRIR or BRIR convolution needs to be applied for every input object or channel separately, and hence complexity typically grows linearly with the number of channels or objects. As headphones are often used in conjunction with battery-powered portable devices, a high computational complexity is not desirable as it may substantially shorten battery life. Moreover, with the introduction of object-based audio content, which may comprise say more than 100 objects active simultaneously, the complexity of HRIR convolution can be substantially higher than for traditional channel-based content.

For this purpose, co-pending and non-published PCT application PCT/US2016/048497, filed Aug. 24, 2016 describes a dual-ended approach for presentation transformations that can be used to efficiently transmit and decode immersive audio for headphones. The coding efficiency and decoding complexity reduction are achieved by splitting the rendering process across encoder and decoder, rather than relying on the decoder alone to render all objects.

FIG. 2 gives a schematic overview of such a dual-ended approach to deliver immersive audio on headphones. With reference to FIG. 2, in the dual-ended approach any acoustic environment simulation algorithm (for example an algorithmic reverberation, such as a feedback delay network or FDN, a convolution reverberation algorithm, or other means to simulate acoustic environments) is driven by a simulation input signal $\hat{f}$ that is derived from a core decoder output stereo signal z by application of time and frequency dependent parameters w that are included in the bit stream. The parameters w are used as matrix coefficients to perform a matrix transform of the stereo signal z, to generate an anechoic binaural signal $\hat{y}$ and the simulation input signal $\hat{f}$. It is important to realize that the simulation input signal $\hat{f}$ typically consists of a mixture of various of the objects that were provided to the encoder as input, and moreover the contribution of these individual input objects can vary depending on the object distance, the headphone rendering metadata, semantic labels, and alike. Subsequently the input signal $\hat{f}$ is used to produce the output of the acoustic environment simulation algorithm and is mixed with the anechoic binaural signal $\hat{y}$ to create the echoic, final binaural presentation.

Although the acoustic environment simulation input signal $\hat{f}$ is derived from a stereo signal using the set of parameters, its level (for example its energy as a function of frequency) is not a priori known nor available. Such properties can be measured in a decoder at the expense of introducing additional complexity and latency, which both are undesirable on mobile platforms.

Further, the environment simulation input signal typically increases in level with object distance to simulate the decreasing direct-to-late reverberation ratio that occurs in physical environments. This implies that there is no well-defined upper bound of the input signal $\hat{f}$, which is problematic from an implementation point of view requiring a bounded dynamic range.

Also, if the simulation algorithm is end-user configurable, the transfer function of the acoustic environment simulation algorithm is not known during encoding. As a consequence, the signal level (and hence the perceived loudness) of the binaural presentation after mixing in the acoustic environment simulation output signal is unknown.

The fact that both the input signal level and the transfer function of the acoustic environment simulation are unknown makes it difficult to control the loudness of the binaural presentation. Such loudness preservation is generally very desirable for end-user convenience as well as broadcast loudness compliance as standardized in for example ITU-R bs.1770 and EBU R128.

SUMMARY OF THE INVENTION

It is an object of the invention, in its preferred form, to provide encoding and decoding of immersive audio signals with improved environment simulation.

In accordance with a first aspect of the present invention, there is provided a method of encoding an audio signal having one or more audio components, wherein each audio component is associated with a spatial location, the method including the steps of rendering a first audio signal presentation (z) of the audio components, determining a simulation input signal ($\hat{f}$) intended for acoustic environment simulation of the audio components, determining a first set of transform parameters (w(f)) configured to enable reconstruction of the simulation input signal ($\hat{f}$) from the first audio signal presentation (z), determining signal level data ($\beta^2$) indicative of a signal level of the simulation input signal (f), and encoding the first audio signal presentation (z), the set of transform parameters (w(f)) and the signal level data ($\beta^2$) for transmission to a decoder.

In accordance with a second aspect of the present invention, there is provided a method of decoding an audio signal having one or more audio components, wherein each audio component is associated with a spatial location, the method including the steps of receiving and decoding a first audio signal presentation (z) of the audio components, a first set of transform parameters (w(f)), and signal level data ($\beta^2$), applying the first set of transform parameters (w(f)) to the first audio signal presentation (z) to form a reconstructed simulation input signal ($\hat{f}$) intended for an acoustic environment simulation, applying a signal level modification ($\alpha$) to the reconstructed simulation input signal, the signal level modification being based on the signal level data ($\beta^2$) and data ($p^2$) related to the acoustic environment simulation, processing the level modified reconstructed simulation input signal ($\hat{f}$) in the acoustic environment simulation, and combining an output of the acoustic environment simulation with the first audio signal presentation (z) to form an audio output.

In accordance with a third aspect of the present invention, there is provided an encoder for encoding an audio signal having one or more audio components, wherein each audio component is associated with a spatial location, the encoder comprising a renderer for rendering a first audio signal presentation (z) of the audio components, a module for determining a simulation input signal (n intended for acoustic environment simulation of the audio components, a transform parameter determination unit for determining a first set of transform parameters (w(f)) configured to enable reconstruction of the simulation input signal ($\hat{f}$) from the first audio signal presentation (z) and for determining signal level data ($\beta^2$) indicative of a signal level of the simulation input signal (n, and a core encoder unit for encoding the first audio signal presentation (z), said set of transform parameters (w(f)) and said signal level data ($\beta^2$) for transmission to a decoder.

In accordance with a fourth aspect of the present invention, there is provided a decoder for decoding an audio signal having one or more audio components, wherein each audio component is associated with a spatial location, the decoder comprising a core decoder unit for receiving and decoding a first audio signal presentation (z) of the audio components, a first set of transform parameters (w(f)), and signal level data ($\beta^2$), a transformation unit for applying the first set of transform parameters (w(f)) to the first audio signal presentation (z) to form a reconstructed simulation input signal ($\hat{f}$) intended for an acoustic environment simulation, a computation block for applying a signal level modification ($\alpha$) to the simulation input signal, the signal level modification being based on the signal level data ($\beta^2$) and data ($p^2$) related to the acoustic environment simulation, an acoustic environment simulator for performing an acoustic environment simulation on the level modified reconstructed simulation input signal ($\hat{f}$), and a mixer for combining an output of the acoustic environment simulator with the first audio signal presentation (z) to form an audio output.

According to the invention, signal level data is determined in the encoder and is transmitted in the encoded bit stream to the decoder. A signal level modification (attenuation or gain) based on this data and one or more parameters derived from the acoustic environment simulation algorithm (e.g. from its transfer function) is then applied to the simulation input signal before processing by the acoustic simulation algorithm. With this process, the decoder does not need to determine the signal level of the simulation input signal, thereby reducing processing load. It is noted that first set of transform parameters, configured to enable reconstruction of the simulation input signal, may be determined by minimizing a measure of a difference between the simulation input signal and a result of applying the transform parameters to the first audio signal presentation. Such parameters are discussed in more detail in PCT application PCT/US2016/048497, filed Aug. 24, 2016.

The signal level data is preferably a ratio between a signal level of the acoustic simulation input signal and a signal level of the first audio signal presentation. It may also be a ratio between a signal level of the acoustic simulation input signal and a signal level of the audio components, or a function thereof.

The signal level data is preferably operating in one or more sub bands and may be time varying, e.g., are applied in individual time/frequency tiles.

The invention may advantageously be implemented in a so called simulcast system, where the encoded bit stream also includes a second set of transform parameters suitable for transforming the first audio signal presentation to a second audio signal presentation. In this case, the output from the acoustic environment simulation is mixed with the second audio signal presentation.

BRIEF DESCRIPTION OF THE DRAWINGS

Embodiments of the invention will now be described, by way of example only, with reference to the accompanying drawings in which.

DETAILED DESCRIPTION

Figure 1:
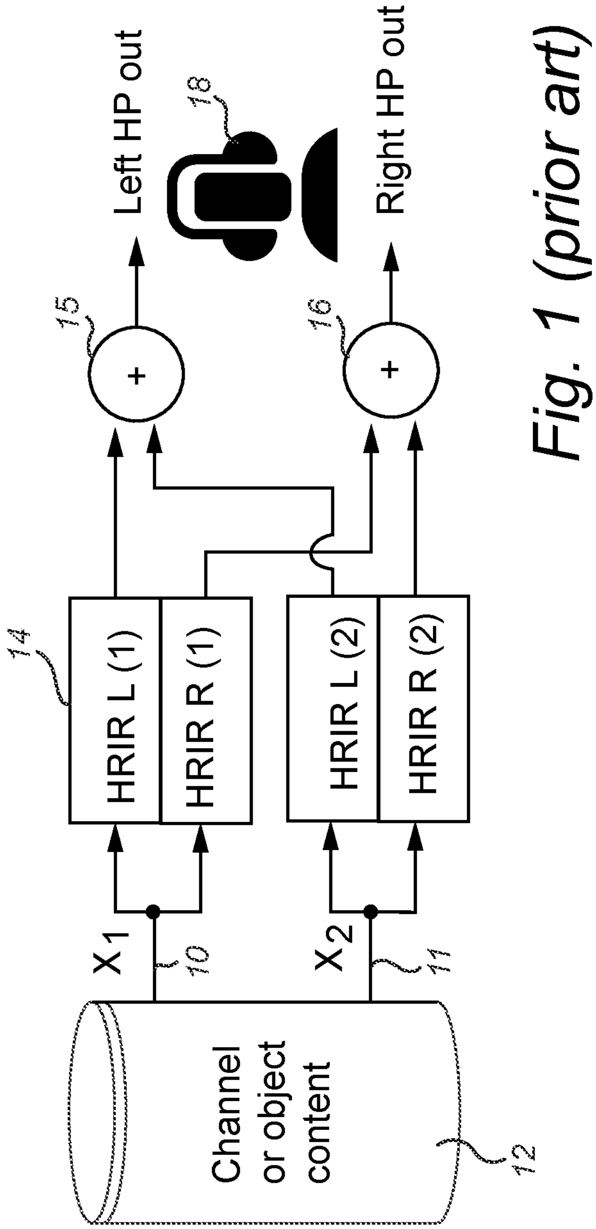
Fig. 1 (prior art)
FIG. 1 illustrates a schematic overview of the HRIR convolution process for two sound sources or objects, with each channel or object being processed by a pair of HRIRs/BRIRs.

Systems and methods disclosed in the following may be implemented as software, firmware, hardware or a combination thereof. In a hardware implementation, the division of tasks referred to as "stages" in the below description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Application in a Per-Object Binaural Renderer

The proposed approach will first be discussed with reference to a per-object renderer. In the following, the binaural presentation $l_{i,b}$, $r_{i,b}$ of object $x_i$ can be written as:

$$l_{i,b}=(H_{i,l}*x_i+g_{i,f}F_l*x_i)\alpha_i,$$

$$r_{i,b}=(H_{i,r}*x_i+g_{i,f}F_r*x_i)\alpha_i.$$

Here $H_{i,l}$ and $H_{i,r}$ denote the left and right-ear head-related impulse responses (HRIRs), $F_l$ and $F_r$ denote the early reflections and/or late reverberation impulse responses for the left and right ears (e.g. the impulse responses of the acoustic environment simulation). The gain $g_{i,f}$ applied to the environment simulation contribution reflects the change in the direct-to-late reverberation ratio with distance, which is often formulated as $g_{i,f}=d_i$, with $d_i$ the distance of object i expressed in meters. A subscript f for the gain $g_{i,f}$ is included to indicate that is the gain for object i prior to convolution with early reflections and/or late reverberation impulse responses $F_l$ and $F_r$. Finally, an overall output attenuation $\alpha$ is applied which is intended to preserve loudness irrespective of the object distance $d_i$ and hence the gain $g_{i,f}$. A useful expression for this attenuation for object $x_i$ is:

$$\alpha_i = \frac{1}{\sqrt{1+g_{i,f}^2 p^2}},$$

where p is a loudness correction parameter that depends on the transfer functions $F_l$ and $F_r$ to determine how much energy is added due to their contributions. Generally the parameter p may be described as a function $\Lambda$ of the transfer functions $F_l$ and $F_r$ and optionally the HRIRs $H_{i,l}$ and $H_{i,r}$:

$$p^2=\Lambda(F_l,F_r),$$

$$p^2=\Lambda(F_l,F_r,H_{i,l},H_{i,r}).$$

In the above formulation, there is a common pair of early reflections and/or late reverberation impulse responses $F_l$ and $F_r$ that is shared across all objects i as well as per-object variables (gains) $g_{i,f}$ and $\alpha_i$. Besides such common set of reverberation impulse responses that is shared across inputs, each object can also have its own pair of early reflections and/or late reverberation impulse responses $F_{i,l}$ and $F_{i,r}$:

$$l_{i,b}=(H_{i,l}*x_i+g_{i,f}F_{i,l}*x_i)\alpha_i,$$

$$r_{i,b}=(H_{i,r}*x_i+g_{i,f}F_{i,r}*x_i)\alpha_i.$$

A variety of algorithms and methods can be applied to compute the loudness correction parameter p. One method is to aim for energy preservation of the binaural presentation $l_{i,b}$, $r_{i,b}$ as a function of the distance $d_i$. If this needs to operate independently of the actual signal characteristics of the object signal $x_i$ being rendered, the impulse responses may be used instead. If the binaural impulse response for the left and right ears for object i are expressed as $b_{i,l}$, $b_{i,r}$ respectively, then:

$$b_{i,l}=(H_{i,l}+g_{i,f}F_l)\alpha_i,$$

$$b_{i,r}=(H_{i,r}+g_{i,f}F_r)\alpha_i.$$

Further:

$$\langle b_{i,l}^2\rangle=(\langle H_{i,l}^2\rangle+g_{i,f}^2\langle F_l^2\rangle)\alpha_i^2,$$

$$\langle b_{i,r}^2\rangle=(\langle H_{i,r}^2\rangle+g_{i,f}^2\langle F_r^2\rangle)\alpha_i^2.$$

If it is required that $$\langle b_{i,l}^2\rangle\approx\langle H_{i,l}^2\rangle$$

$$\langle b_{i,r}^2\rangle\approx\langle H_{i,r}^2\rangle$$

this provides $$\alpha_i^2 = \Lambda(F_l, F_r, H_{i,l}, H_{i,r}) = \frac{\langle H_{i,l}^2\rangle + \langle H_{i,r}^2\rangle}{\langle H_{i,l}^2\rangle + g_{i,f}^2\langle F_l^2\rangle + \langle H_{i,r}^2\rangle + g_{i,f}^2\langle F_r^2\rangle}.$$

If it is further assumed that the HRIRs have approximately unit power, e.g., $\langle H_{i,l}^2\rangle\approx\langle H_{i,r}^2\rangle\approx 1$, the above expression may be reduced to:

$$\alpha_i^2 = \frac{1}{1+g_{i,f}^2 p^2},$$

-continued with $$p^2 = \frac{\langle F_l^2 \rangle + \langle F_r^2 \rangle}{2}.$$

If it is further assumed that the energies $\langle F_l^2 \rangle$ and $\langle F_r^2 \rangle$ are both (virtually) identical and equal to $\langle F^2 \rangle$, then $$p^2 = \langle F^2 \rangle.$$

It should be noted however that besides energy preservation, more advanced methods to calculate p can be applied that apply perceptual models to obtain loudness preservation rather than energy preservation. More importantly, the process above can be applied in individual sub bands rather than on broad-band impulse responses.

Application in an Immersive Stereo Coder

In an immersive stereo encoder, object signals $x_i$ with object index i are summed to create an acoustic environment simulation input signal f[n]:

$$f[n] = \sum_i g_{i,f} x_i[n]$$

The index n can refer to a time-domain discrete sample index, a sub-band sample index, or transform index such as a discrete Fourier transform (DFT), discrete cosine transform (DCT) or alike. The gains $g_{i,f}$ are dependent on the object distance and other per-object rendering metadata, and can be time varying.

Figure 2:
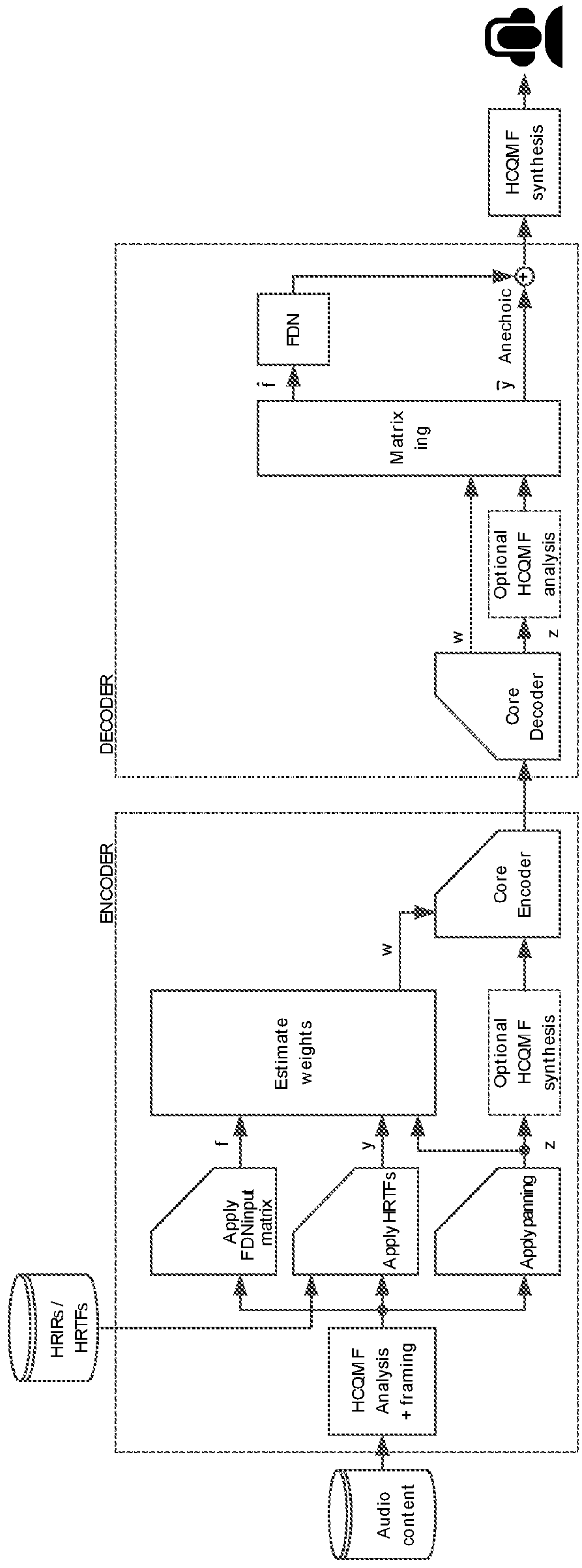
FIG. 2 illustrates a schematic overview of a dual-ended system for delivering immersive audio on headphones.

The decoder retrieves signal $\hat{f}[n]$ either by decoding the signal, or by parametric reconstruction using parameters as discussed in PCT application PCT/US2016/048497, filed Aug. 24, 2016, herewith incorporated by reference, and then processes this signal by applying impulse responses $F_l$ and $F_r$ to create a stereo acoustic environment simulation signal, and combines this with the anechoic binaural signal pair $\hat{y}_l$, $\hat{y}_r$, denoted $\hat{y}$ in FIG. 2, to create the echoic binaural presentation including an overall gain or attenuation α:

$$l_b = (\hat{y}_l + F_l * \hat{f})\alpha,$$

$$r_b = (\hat{y}_r + F_r * \hat{f})\alpha.$$

In the immersive stereo decoder in FIG. 2, the signals $\hat{f}[n]$, $\hat{y}_l[n]$, $\hat{y}_r[n]$ are all reconstructed from a stereo loudspeaker presentation denoted by $z_l$, $z_r$, for the left and right channel, respectively using parameters w:

$$\hat{y}_l = w_{11}(y) z_l + w_{12}(y) z_r$$

$$\hat{y}_r = w_{21}(y) z_l + w_{22}(y) z_r$$

$$\hat{f} = w_1(f) z_l + w_2(f) z_r$$

The desired attenuation α is now common to all objects present in the signal mixture $\hat{f}$. In other words, a per-object attenuation cannot be applied to compensate for acoustic environment simulation contributions. It is still possible, however, to require that the expected value of the binaural presentation has a constant energy:

$$\langle l_b^2 \rangle \approx (\langle \hat{y}_l^2 \rangle + \langle F_l^2 \rangle \langle \hat{f}^2 \rangle)\alpha^2$$

$$\langle r_b^2 \rangle \approx (\langle \hat{y}_r^2 \rangle + \langle F_r^2 \rangle \langle \hat{f}^2 \rangle)\alpha^2$$

which gives $$\alpha^2 = \frac{\langle \hat{y}_l^2 \rangle + \langle \hat{y}_r^2 \rangle}{\langle \hat{y}_l^2 \rangle + \langle \hat{y}_r^2 \rangle + \langle F_l^2 \rangle \langle \hat{f}^2 \rangle + \langle F_r^2 \rangle \langle \hat{f}^2 \rangle}$$

If it is again assumed that HRIRs have approximately unit energy e.g., $\langle H_{i,l}^2 \rangle \approx \langle H_{i,r}^2 \rangle \approx 1$ which implies that $\langle z_l^2 \rangle + \langle z_r^2 \rangle \approx \langle \hat{y}_l^2 \rangle + \langle \hat{y}_r^2 \rangle \approx \Sigma_i \langle x_i^2 \rangle$, and therefore:

$$\alpha^2 \approx \frac{\langle z_l^2 \rangle + \langle z_r^2 \rangle}{\langle z_l^2 \rangle + \langle z_r^2 \rangle + \langle F_l^2 \rangle \langle \hat{f}^2 \rangle + \langle F_r^2 \rangle \langle \hat{f}^2 \rangle} = \frac{2}{2 + \frac{\langle \hat{f}^2 \rangle}{\langle z_l^2 \rangle + \langle z_r^2 \rangle}(\langle F_l^2 \rangle + \langle F_r^2 \rangle)} = \frac{1}{1 + p^2 \frac{\langle \hat{f}^2 \rangle}{\langle z_l^2 \rangle + \langle z_r^2 \rangle}}$$

From the above expression, it is clear that the squared attenuation $\alpha^2$ can be calculated using the acoustic environment simulation parameter $p^2$ and the ratio:

$$\beta^2 = \frac{\langle \hat{f}^2 \rangle}{\langle z_l^2 \rangle + \langle z_r^2 \rangle}$$

Furthermore, if the stereo loudspeaker signal pair $z_l$, $z_r$ is generated by an amplitude panning algorithm with energy preservation, then:

$$\beta^2 = \frac{\langle \hat{f}^2 \rangle}{\langle z_l^2 \rangle + \langle z_r^2 \rangle} = \frac{\langle \hat{f}^2 \rangle}{\sum_i \langle x_i^2 \rangle}$$

This ratio is referred to as acoustic environment simulation level data, or signal level data $\beta^2$. The value of $\beta^2$ in combination with the environment simulation parameter $p^2$ allows calculation of the squared attenuation $\alpha^2$. By transmitting the signal level data $\beta^2$ as part of the encoded signal it is not required to measure $\langle \hat{f}^2 \rangle$ in the decoder. As can be observed from the equation above, the signal level data $\beta^2$ can be computed either using the stereo presentation signals $z_l$, $z_r$, or from the energetic sum of the object signals $\Sigma_i \langle x_i^2 \rangle$.

Dynamic Range Control of $\hat{f}$

Referring to the equation above to compute the signal f:

$$f[n] = \sum_i g_{i,f} x_i[n]$$

If the per-object gains $g_{i,f}$ increase monotonically (e.g. linearly) with the object distance $d_i$, the signal f is ill conditioned for discrete coding systems in the sense that it is has no well-defined upper bound.

If, however, the coding system transmits the data $\beta^2$, as discussed above, these parameters may be re-used to condition the signal f to make it suitable for encoding and decoding. In particular, the signal f can be attenuated prior to encoding to create a conditioned signal f':

$$f'[n] = \frac{\sum_i g_{i,f} x_i[n]}{\max(1, \beta)} = \frac{f[n]}{\max(1, \beta)}$$

This operation ensures that $\langle z_l^2 \rangle + \langle z_r^2 \rangle \approx \langle y_l^2 \rangle + \langle y_r^2 \rangle \geq \langle f'^2 \rangle$ which brings the signal f' in the same dynamic range as other signals being coded and rendered.

In the decoder, the inverse operation may be applied:

$$\hat{f} = \min\left(1, \frac{1}{\beta}\right) f'$$

In other words, besides using the signal level data $\beta^2$ to allow loudness-preserving distance modification, this data may be used to condition the signal f to allow more accurate coding and reconstruction.

General Encoding/Decoding Approach

Figure 3A:
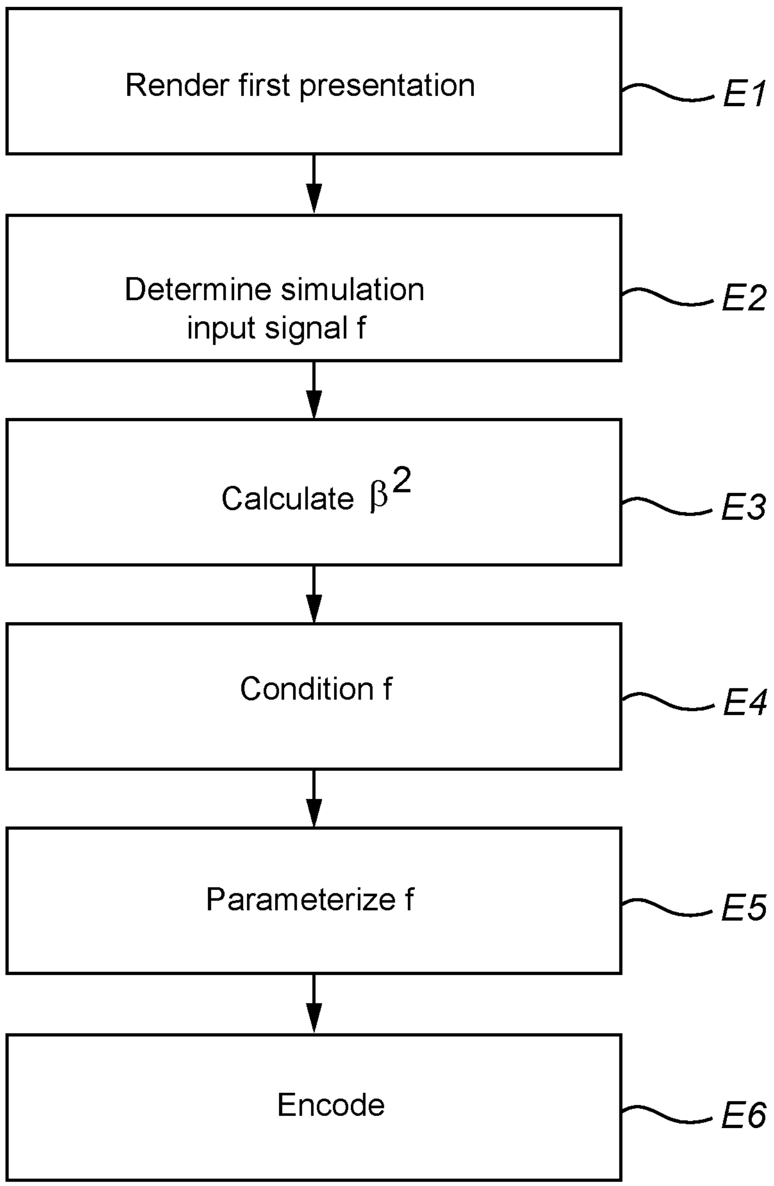
FIGS. 3*a-b* are flow charts of methods according to embodiments of the present invention.
Figure 3B:
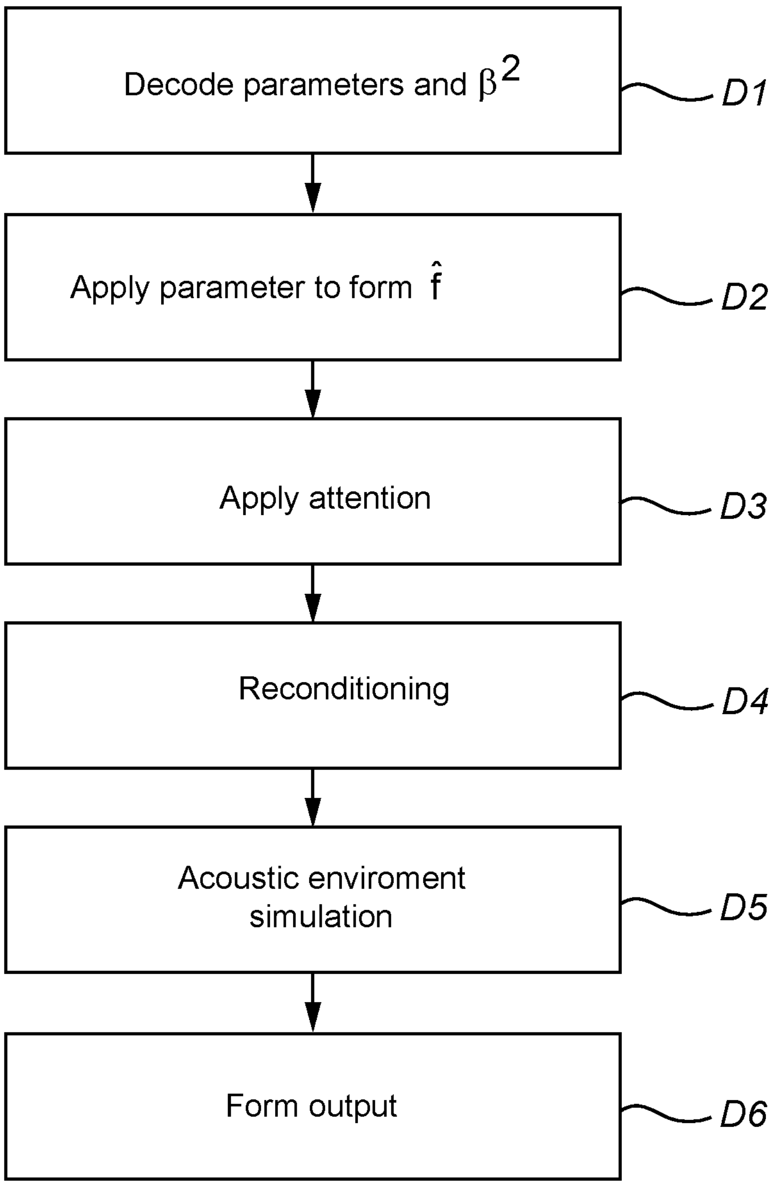

FIG. 3*a-b* schematically illustrates encoding (FIG. 3*a*) and decoding (FIG. 3*b*) according to an embodiment of the present invention.

On the encoder side, in step E1, a first audio signal presentation is rendered of the audio components. This presentation may be a stereo presentation or any other presentation considered suitable for transmission to the decoder. Then, in step E2, a simulation input signal is determined, which simulation input signal is intended for acoustic environment simulation of the audio components. In step E3, the signal level parameter $\beta^2$ indicative of a signal level of the acoustic simulation input signal with respect to the first audio signal presentation is calculated. Optionally, in step E4, the simulation input signal is conditioned to provide dynamic control (see above). Then, in step E5, the simulation input signal is parameterized into a set of transform parameters configured to enable reconstruction of the simulation input signal from the first audio signal presentation. The parameters may e.g. be weights to be implemented in a transform matrix. Finally, in step E6, the first audio signal presentation, the set of transform parameters and the signal level parameter are encoded for transmission to the decoder.

On the decoder side, in step D1 the first audio signal presentation, the set of transform parameters and the signal level data are received and decoded. Then, in step D2, the set of transform parameters are applied to the first audio signal presentation to form a reconstructed simulation input signal intended for acoustic environment simulation of the audio components. Note that this reconstructed simulation input signal is not identical to the original simulation input signal determined on the encoder side, but is an estimation generated by the set of transform parameters. Further, in step D3, a signal level modification $\alpha$ is applied to the simulation input signal based on the signal level parameter $\beta^2$ and a factor $p^2$ based on the transfer function F of the acoustic environment simulation, as discussed above. The signal level modification is typically an attenuation, but may in some circumstances also be a gain. The signal level modification $\alpha$ may also be based on a user provided distance scalar, as discussed below. In case the optional conditioning of the simulation input signal has been performed in the encoder, then in step D4 the inverse of this conditioning is performed. The modified simulation input signal is then processed (step D5) in an acoustic environment simulator, e.g. a feedback delay network, to form an acoustic environment compensation signal. Finally, in step D6, the compensation signal is combined with the first audio signal presentation to form an audio output.

Time/Frequency Variability

It should be noted that $\beta^2$ will vary as a function of time (objects may change distance, or may be replaced by other objects with different distances) and as a function of frequency (some objects may be dominant in certain frequency ranges while only having a small contribution in other frequency ranges). In other words, $\beta^2$ ideally is transmitted from encoder to decoder for every time/frequency tile independently. Moreover, the squared attenuation $\alpha^2$ is also applied in each time/frequency tile. This can be realized using a wide variety of transforms (discrete Fourier transform or DFT, discrete cosine transform or DCT) and filter banks (quadrature mirror filter bank, etcetera).

Use of Semantic Labels

Besides variability in distance, other object properties might result in a per-object change in their respective gains $g_{i,f}$. For example, objects may be associated with semantic labels such as indicators of dialog, music, and effects. Specific semantic labels may give rise to different values of $g_{i,f}$. For example, it is often undesirable to apply a large amount of acoustic environment simulation to dialog signals. Consequently, it is often desired to have small values for $g_{i,f}$ if an object is labeled as dialog, and large values for $g_{i,f}$ for other semantic labels.

Headphone Rendering Metadata

Another factor that might influence object gains $g_{i,f}$ can be the use of headphone rendering data. For example, objects may be associated with rendering metadata indicating that the object should be rendered in one of the following rendering modes:

- 'Far', indicating the object is to be perceived far away from the listener, resulting in large values of $g_{i,f}$, unless the object position indicates that the object is very close to the listener;
- 'Near', indicating that the object is to be perceived close to the listener, resulting in small values of $g_{i,f}$. Such mode can also be referred to as 'neutral timbre' due to the limited contribution of the acoustic environment simulation.
- 'Bypass', indicating that binaural rendering should be bypassed for this particular object, and hence $g_{i,f}$ is substantially close to zero.

Acoustic Environment Simulation (Room) Adaptation

The method described above can be used to change the acoustic environment simulation at the decoder side without changing the overall loudness of the rendered scene. A decoder may be configured to process the acoustic environment simulation input signal by dedicated room impulse responses or transfer functions $F_l$ and $F_r$. These impulse responses may be realized by convolution, or by an algorithm reverberation algorithm such as a feedback-delay network (FDN). One purpose for such adaptation would be to simulate a specific virtual environment, such as a studio environment, a living room, a church, a cathedral, etc. Whenever the transfer functions $F_l$ and $F_r$ are determined, the loudness correction factor can be re-calculated:

$$p^2 = \frac{\langle F_l^2 \rangle + \langle F_r^2 \rangle}{2}.$$

This updated loudness correction factor is subsequently used to calculate the desired attenuation $\alpha$ in response to transmitted acoustic environment simulation level data $\beta^2$:

$$\alpha^2 = \frac{1}{1+p^2\beta^2}.$$

To avoid the computational load to determine $\langle F_l^2 \rangle$, $\langle F_r^2 \rangle$ and $p^2$, the values for $p^2$ can be pre-calculated and stored as part of room simulation presets associated with specific realizations of $\langle F_l^2 \rangle$, $\langle F_r^2 \rangle$. Alternatively or additionally, the impulse responses $\langle F_l^2 \rangle$, $\langle F_r^2 \rangle$ may be determined or controlled based on a parametric description of desired properties such as a direct-to-late reverberation ratio, an energy decay curve, reverberation time or any other common property to describe attributes of reverberation such as described in Kuttruff, Heinrich: "Room acoustics". CRC Press, 2009. In that case, the value of $p^2$ may be estimated, computed or pre-computed from such parametric properties rather than from the actual impulse response realizations $\langle F_l^2 \rangle$, $\langle F_r^2 \rangle$.

Overall Distance Scaling

The decoder may be configured with an overall distance scaling parameter which scales the rendering distance by a certain factor that may be smaller or larger than +1. If this distance scalar is denoted by γ, the binaural presentation in the decoder follows directly from $g_i=\gamma d_i$, and therefore:

$$l_b=(y_l+\gamma F_l * \hat{f})\alpha(\gamma),$$

$$r_b=(y_r+\gamma F_r * \hat{f})\alpha(\gamma)$$

Due to this multiplication, the energy of the signal $\hat{f}$ has effectively increased by a factor $\gamma^2$, so the desired signal level modification α can be calculated as:

$$\alpha^2(\gamma) = \frac{1}{1+\gamma^2 p^2\beta^2}.$$

Encoder and Decoder Overview

Figure 4:
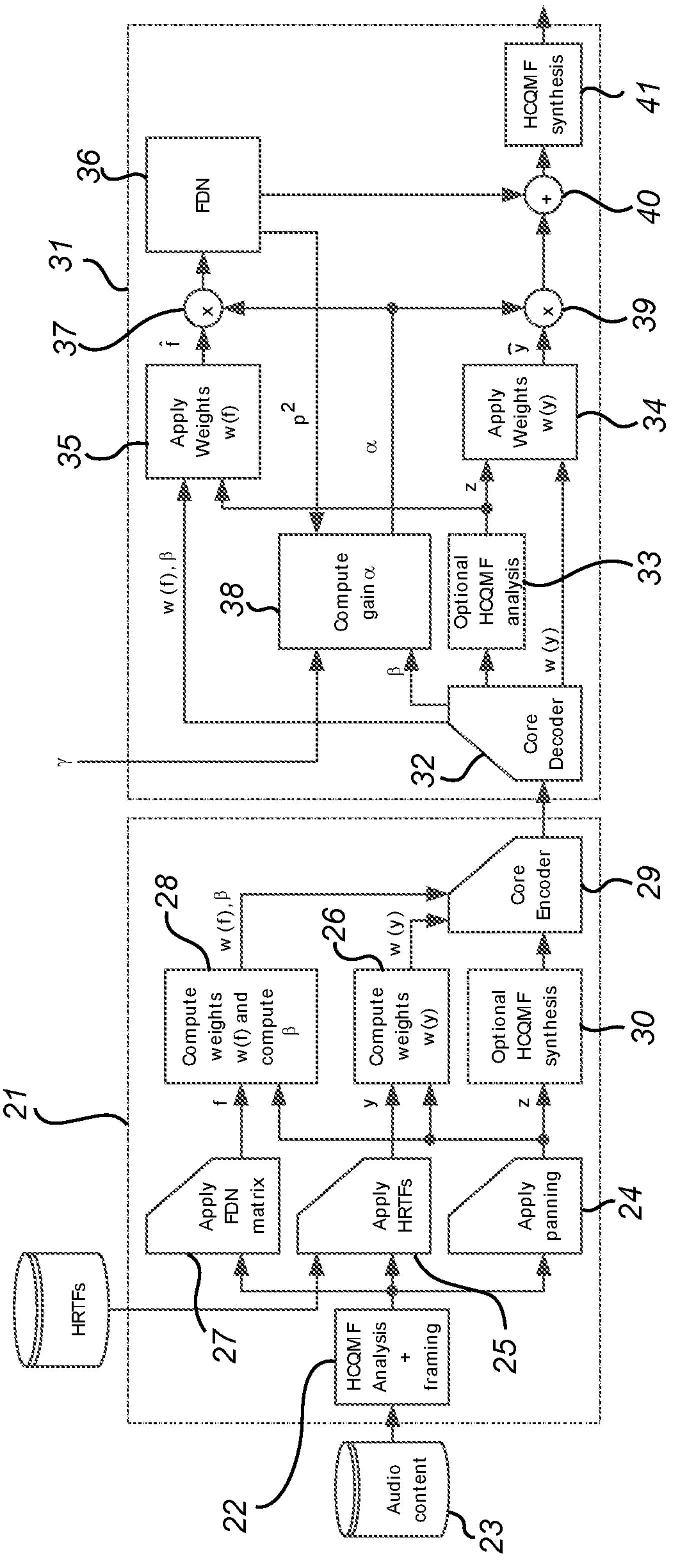
FIG. 4 illustrates a schematic overview of an encoder and a decoder according to embodiments of the present invention.

FIG. 4 demonstrates how the proposed invention can be implemented in an encoder and decoder adapted to deliver immersive audio on headphones.

The encoder 21 (left-hand side of FIG. 4) comprises a conversion module 22 adapted to receive input audio content (channels, objects, or combinations thereof) from a source 23, and process this input to form sub-band signals. In this particular example the conversion involves using a hybrid complex quadrature mirror filter (HCQMF) bank followed by framing and windowing with overlapping windows, although other transforms and/or filterbanks may be used instead, such as complex quadrature mirror filter (CQMF) bank, discrete Fourier transform (DFT), modified discrete cosine transform (MDCT), etc. An amplitude-panning renderer 24 is adapted to render the sub-band signals for loudspeaker playback resulting in a loudspeaker signal $z=\{z_l, z_r\}$.

A binaural renderer 25 is adapted to render a anechoic binaural presentation y (step S3) with $y=\{y_l, y_r\}$ by applying a pair of HRIRs (if the process is applied in the time domain) or Head Related Transfer Functions (HRTFs, if the process is applied in the frequency domain) from a HRIR/HRTF database to each input followed by summation of each input's contribution. A transform parameter determination unit 26 is adapted to receive the binaural presentation y and the loudspeaker signal z, and to calculate a set of parameters (matrix weights) w(y) suitable for reconstructing the binaural representation. The principles of such parameterization are discussed in detail in PCT application PCT/US2016/048497, filed Aug. 24, 2016, hereby incorporated by reference. In brief, the parameters are determined by minimizing a measure of a difference between the binaural presentation y and a result of applying the transform parameters to the loudspeaker signal z.

The encoder further comprises a module 27 for determining an input signal f for a late-reverberation algorithm, such as a feedback-delay network (FDN). A transform parameter determination unit 28 similar to unit 26 is adapted to receive the input signal f and the loudspeaker signal z, and to calculate a set of parameters (matrix weights) w(f). The parameters are determined by minimizing a measure of a difference between the input signal f and a result of applying the parameters to the loudspeaker signal z. The unit 28 is here further adapted to calculate signal level data $\beta^2$ based on the energy ratio between f and z in each frame as discussed above.

The loudspeaker signal z, the parameters w(y) and w(f), and the signal level data $\beta^2$ are all encoded by a core coder unit 29 and included in the core coder bitstream which is transmitted to the decoder 31. Different core coders can be used, such as MPEG 1 layer 1, 2, and 3 or Dolby AC4. If the core coder is not able to use sub-band signals as input, the sub-band signals may first be converted to the time domain using a hybrid quadrature mirror filter (HCQMF) synthesis filter bank 30, or other suitable inverse transform or synthesis filter bank corresponding to the transform or analysis filterbank used in block 22.

The decoder 31 (right hand side of FIG. 4) comprises a core decoder unit 32 for decoding the received signals to obtain the HCQMF-domain representations of frames of the loudspeaker signal z, the parameters w(y) and w(f), and the signal level data $\beta^2$. An optional HCQMF analysis filter bank 33 may be required if the core decoder does not produce signals in the HCQMF domain.

A transformation unit 34 is configured to transform the loudspeaker signal z into a reconstruction ŷ of the binaural signal y by using the parameters w(y) as weights in a transform matrix. A similar transformation unit 35 is configured to transform the loudspeaker signal z into a reconstruction $\hat{f}$ of the simulation input signal $\hat{f}$ by using the parameters w(f) as weights in a transform matrix. The reconstructed simulation input signal $\hat{f}$ is supplied to an acoustic environment simulator, here a feedback delay network, FDN, 36, via a signal level modification block 37. The FDN 36 is configured to process the attenuated signal $\hat{f}$ and provide a resulting FDN output signal.

The decoder further comprises a computation block 38 configured to compute a gain/attenuation α of the block 37. The gain/attenuation α is based on the simulation level data $\beta^2$ and an FDN loudness correction factor $p^2$ received from the FDN 36. Optionally, the block 38 also receives a distance scalar γ determined in response to input from the end-user, which is used in the determination of α.

A second signal level modification block 39 is configured to apply the gain/attenuation α also to the reconstructed anechoic binaural signal ŷ. It is noted that the attenuation applied by the block 39 is not necessarily identical to the gain/attenuation α, but may be a function thereof. Further, the decoder 31 comprises a mixer 40 arranged to mix the attenuated signal Si with the output from the FDN 36. The resulting echoic binaural signal is sent to a HCQMF synthesis block 41, configured to provide an audio output.

In FIG. 4, the optional (but additional) conditioning of the signal $\hat{f}$ for the purposes of dynamic range control (see above) is not shown but can easily be combined with the signal level modification $\alpha$.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described specific embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of encoding audio content having one or more audio components, wherein each audio component is associated with a spatial location, the method comprising:

determining, by rendering the audio components, an audio signal presentation;

determining, from the audio components, a simulation input signal, wherein the simulation input signal comprises a weighted combination of the audio components;

determining one or more transform parameters configured to enable reconstruction of the simulation input signal from the audio signal presentation;

determining signal level data indicative of a signal level of the simulation input signal; and encoding the audio signal presentation, the one or more transform parameters, and the signal level data into a bitstream.

2. The method of claim 1, wherein a weight for a respective audio component depends on a signal type of the respective audio component.

3. The method of claim 2, wherein the signal type of the respective audio component is either dialog, or music, or effects.

4. The method of claim 3, wherein the weight for a dialog audio component is relatively smaller than the weight for a music audio component or an effects audio component.

5. The method of claim 1, wherein a weight for a respective audio component depends on a headphone rendering mode for the respective audio component.

6. The method of claim 5, wherein, when the headphone rendering mode is a bypass mode, the weight for the respective audio signal component is substantially close to zero.

7. An encoder for encoding audio content having one or more audio components, wherein each audio component is associated with a spatial location, wherein the encoder is configured for:

determining, by rendering the audio components, an audio signal presentation;

determining, from the audio components, a simulation input signal, wherein the simulation input signal comprises a weighted combination of the audio components;

determining one or more transform parameters configured to enable reconstruction of the simulation input signal from the audio signal presentation;

determining signal level data indicative of a signal level of the simulation input signal; and encoding the audio signal presentation, the one or more transform parameters, and the signal level data into a bitstream.

8. The encoder of claim 7, wherein a weight for a respective audio component depends on a signal type of the respective audio component.

9. The encoder of claim 8, wherein the signal type of the respective audio component is either dialog, or music, or effects.

10. The encoder of claim 9, wherein the weight for a dialog audio component is relatively smaller than the weight for a music audio component or an effects audio component.

11. The encoder of claim 7, wherein a weight for a respective audio component depends on a headphone rendering mode for the respective audio component.

12. The encoder of claim 11, wherein, when the headphone rendering mode is a bypass mode, the weight for the respective audio signal component is substantially close to zero.

13. A non-transitory computer-readable medium storing instructions that, upon execution by one or more processors, cause the one or more processors to perform the method of claim 1.

* * * * *